April 3, 1956     J. P. LONGWELL     2,740,696
POLYMERIZATION APPARATUS UNIT

Filed March 30, 1951     2 Sheets-Sheet 1

John P. Longwell Inventor
By Edwin M. Thomas Attorney

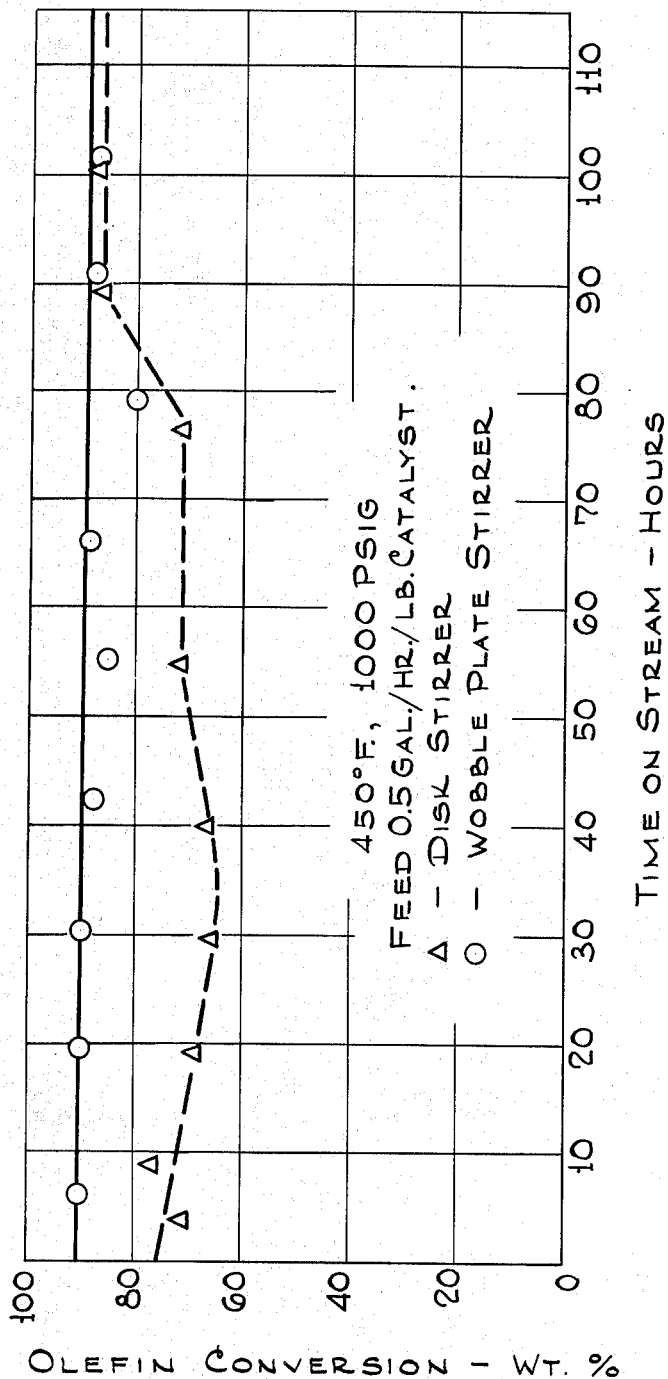

United States Patent Office 2,740,696
Patented Apr. 3, 1956

2,740,696
POLYMERIZATION APPARATUS UNIT

John P. Longwell, Scotch Plains, N. J., assignor to Esso Research and Engineering Company, a corporation of Delaware Application March 30, 1951, Serial No. 218,470

2 Claims. (Cl. 23—252)

The present invention relates to a polymerization process and apparatus therefor, and particularly to a process for the polymerization of lower olefinic hydrocarbons. The products of this process include polymers of relatively low molecular weight which are suitable for use in fuels for internal combustion engines and the like. The invention has particular utility in the polymerization of lower olefins such as ethylene, propylene and butylene to make dimers and trimers which may be blended in gasoline, alkylation feed stocks, and other liquid and relatively volatile hydrocarbon products.

In the prior art various processes have been developed, and various forms of apparatus have been designed, for passing lower olefins through fixed, or relatively fixed, beds of catalyst whereby the olefins, treated under appropriate conditions of temperature and pressure, are converted to lower polymers which make valuable components of gasoline and related fuels. Recently there has been developed a process which eliminates the necessity of using a fixed bed of catalyst. This involves the maintenance of an agitated suspension such as a slurry of finely divided solid particles, carrying active catalytic material with which the olefins are contacted. Such suspensions may be prepared and maintained in various ways as more fully described in a copending application Serial No. 152,858, filed March 30, 1950, by William K. Fell and John D. Leslie. In such processes the feed rate is rather low so that supplementary agitation means, in addition to the movement of the feed, are required to keep the catalyst in suspension.

As pointed out in the application just referred to, olefinic materials such as ethylene, propylene and butylene may be contacted with a polymerization catalyst, such, for example, as phosphoric acid supported upon finely divided solid base, e. g., kieselguhr, at a temperature in the range of about 300 to 650° F. As a rule this process is carried out at pressures higher than those required to condense the normally gaseous olefins at their critical temperatures. The application points out that a mixture of hydrocarbons, including the reactive olefins, may be fed into and mixed with a supply of catalytic material which is maintained in a suspension either in the feed or in a heavier oil. Such contact causes the olefins to polymerize and the reacted materials are subsequently withdrawn for use or further treatment. As pointed out in said application, a finely divided polymerized catalyst of 20 mesh or finer, especially about 40–200 mesh, for example, may be used. The catalyst may be employed with or without a catalyst diluent, e. g., an adsorbent material such as fine silica gel, activated alumina or the like, which may be used under some circumstances to prevent agglomeration.

The olefin fraction must be thoroughly mixed with the catalyst which is kept in suspension in the material being polymerized. It is usually preferable that the pressure be kept above the critical to avoid at any time the co-existence of gaseous and liquid states. At such temperatures and pressures the olefins are in a somewhat nebulous state borderline between liquid and gaseous, but for purposes of the present invention the material may be considered to be a liquid containing the slurry. However, the present invention is applicable to polymerization under other conditions, e. g., under pressures of 200 to 2000 p. s. i. g., though a range of 500 to 1000 p. s. i. g. is usually preferred.

The catalyst employed is preferably a derivative or composite of phosphoric acid, with or without promoters such as nickel or copper phosphate, supported on a finely divided carrier, preferably kieselguhr or silica gel. One suitable catalyst composition consists of about 78% by weight of phosphoric acid supported on about 20% of silica gel. This may, if desired, also include about 2% of a promoter such as nickel phosphate which has been activated at a temperature between 500 and 800° F.

While the catalyst suspension polymerization process appears promising in some respects as a solution to certain problems arising in the conventional fixed bed process, considerable difficulty has been encountered with agglomeration of the suspended catalyst. During the heating and agitation incident to the polymerization process the particles of catalyst, or of catalyst support, tend to cohere and to agglomerate into large and relatively inactive masses. As suggested above, this agglomeration may be eliminated in part by including along with the catalyst a relatively inert separating material such as finely divided silica gel, or activated carbon of small particle size. Even with diluents or separators, however, agglomeration may arise in some cases and a particular object of the present invention is to eliminate, or at least to greatly reduce the agglomeration which results in effective loss of catalyst activity.

A further object of the present invention is to design a simple and efficient polymerization reactor having a minimum of moving parts which will maintain the necessary mechanical agitation to keep the catalyst suspended and will also inhibit or break up agglomeration. This is particularly desirable in a process such as that of olefin polymerization where pressures of the order of 1000 p. s. i. are encountered. The problem of preventing leakage around moving parts such as rotating shafts, or reciprocating members and the like, requires that these parts be kept to a minimum.

At the same time it is important that the feed stock shall pass directly through the reactor without undue impedance and without excessive entrainment of the catalytic material. It is important also that there be a relatively free flow of reactants and catalyst to all parts of the reactor so as to maintain uniform activity throughout. The present invention is designed to accomplish these objectives.

The invention will be more fully understood by reference to a detailed explanation of its construction and operation. The above objectives and other objectives which may be apparent, as the description proceeds, are obtained by relatively simple construction and the process in which the apparatus is used is simple and direct.

Referring to the drawing accompanying this specification,

Figure 5 is a graph showing comparative yields using the apparatus of Figure 1 and a prior art arrangement.

Figure 1:
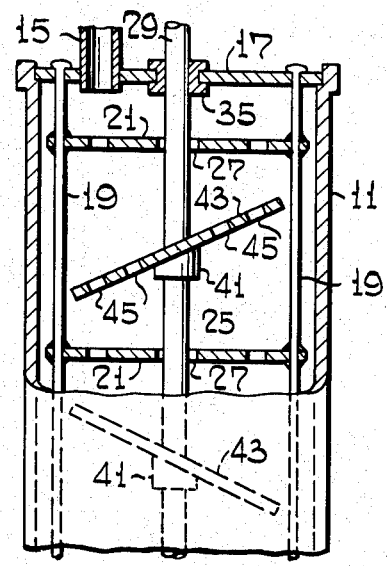
Figure 1 is a front elevational view with some parts omitted, some parts broken away, and other parts shown in section, of an apparatus or reactor incorporating the present invention.

As will be seen in Figure 1, the preferred form of apparatus comprises a relatively tall and slender reactor 11 preferably in the form of a circular cylinder. While the proportions may be varied widely, it is preferred that the ratio of length to diameter of this reactor be between the limits of about 2 to 1 and 10 to 1. An inlet 13 is provided at the bottom for introducing the feed and an outlet 15 is provided at the top for withdrawing the products of reaction and/or unreacted material. If desired, of course, the feed may be introduced at the top and the products withdrawn at the bottom without substantial change in operation. As is well known in the art the incoming feed stock, preferably comprises a good percentage, e. g., 20% or more, preferably up to 50% or more of reactive $C_2$ to $C_4$ olefins. If necessary, the feed may be preheated to maintain a suitable temperature in the reactor. The preheating means where used, and the pump means by which the feed is introduced under pressure into the reactor, form no part of the present invention, being shown in the application previously referred to.

The top 17 is removable and supports a plurality of rods 19 depending therefrom to form a cage structure which is supported inside the reactor and can be withdrawn therefrom. These rods in turn support a plurality of spaced perforated dividing plates or partitions 21 which are fixed to the rods. One of the plates is shown in plan view in Figure 2. Each of the plates 21 is provided with a plurality of perforations 23, through which the feed stock and the catalyst suspended therein may pass freely.

In effect, the reactor 11 is divided into a series of reaction zones 25 by the perforated partition members 21. Each of these partition members is preferably in the form of a fairly rigid plate. The number of openings 23 and their size may vary considerably with the size and manner of operation of the apparatus, but the openings should be sufficiently large and numerous as to permit a fairly easy flow between adjacent zones and in either direction.

Each of the partition members 21 is provided also with a central opening 27 to receive a central rotatable shaft 29. At the bottom the reactor 11 may be provided with a suitable thrust bearing member 33 if desired. If desired the latter may be of the antifriction type but it is shown conventionally without ball or roller bearings. It may be omitted in relatively small installations or guide bearings (not shown) may be provided in one or more of the partition plates 21. The upper end member 17 of the reactor 11 also includes a bearing member 35 which may be provided with a suitable gasket or packing gland material to prevent leakage about the rotating shaft 29. The head 17 of the reactor is of course suitably secured and sealed in position during use.

The rigid rotatable shaft 29 passes through the upper bearing 35 and through all the openings 27 in the partition members 21, its lower end resting in the thrust bearing 33 when such a bearing is used.

Since the reactor is commonly operated at pressures of the order of 200 to 2000 p. s. i. g. care must be taken to maintain a good seal around this shaft 29 where it emerges from the top of the reactor.

Rigidly affixed to the shaft 29 in any suitable manner are a plurality of truncated hub members 41. The top surface of each of these hub members is cut off or truncated at an oblique angle with respect to the shaft 29. This angle may vary somewhat between about 10° to 80°, preferably between 30° and 60°. It is particularly preferred that the angle be between about 40° and 55°, as measured between the axis of the shaft and the truncated face of the hub members 41.

Mounted on each hub member is a rigid, substantially flat plate 43 provided with a plurality of spaced openings 45. These plates may be circular or, if desired, may be elliptical so as to form a circular projection when viewed along the axis of shaft 29. As in the case of the openings 19 in the partition members the number and size of the openings 45 may be varied considerably. The plates 43 are rigidly fixed to the hub members 41 so that they are constrained to rotate with the shaft 29. Hence it will be obvious that if the shaft 29 is rotated by appropriate power means not shown there is a forced agitation within each of the zones 25. It will be understood that there may be several zones in addition to the 3 or 4 shown in the drawings.

Figure 3:
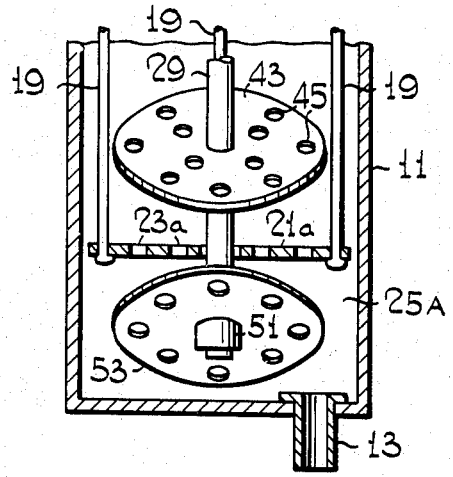
Figure 3 is a fragmentary view of the lower part of an apparatus corresponding in general to that of Figure 1, but with some modification, this view being taken at right angles to the view of Figure 1, showing certain details of construction.
Figure 2:
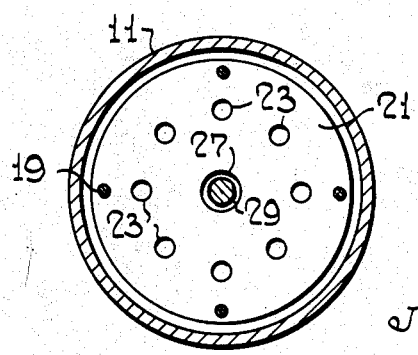
Figure 2 is a plan view of one of the separator plates which form the feature of the invention.

While the partition members 21, and the agitating plates 43, are shown in Figures 1, 2 and 3 as having a plurality of openings of more or less uniform size and spacing, it is not at all essential that the construction be so limited. Either the partition elements 21 or the plates 43 may be provided with openings of various size and spacing. It is important, however, that the relation between the openings in the agitator plates 43 and the speed with which shaft 29 is rotated be such that the catalyst is keep well suspended and that parts of the catalyst which tend to agglomerate be broken up into finely divided particles. The shearing of the slurry which is forced back and forth through the openings 23 and 45 etc., is such as to break up any tendency to agglomerate. The shape and arrangement of the agitator plates 43 are such as to cause very active agitation within each zone, extending to all parts thereof. The action of these agitator plates also causes circulation from zone to zone in both directions. This substantially prevents the accumulation of larger particles.

In order to prevent settling of the larger particles of catalyst and other solid materials toward the bottom of the reactor an impeller 49 is also secured to the shaft 29, in the embodiment of Figure 1. The impeller and the agitator or "wobble" plates 43 maintain good suspension but the action is not such as to cause formation of continuous voids for substantial distances throughout the reactor which would interfere with efficient catalyst contact.

The rotary action of the agitator plates 43 produces a churning action in each of the zones 25 of the reaction chamber. The use of substantially plane plates 43 set at an oblique angle to their supporting shaft and constrained for rotation therewith has been found in practice to give highly effective catalyst contact and also to substantially prevent agglomeration. In Figure 5 there is shown a comparison between this type of operation and a similar operation where a plurality of flat non-wobbling plates were used for stirring. The improved conversion of olefin to polymer, especially during the first 10 to 80 hours, is striking.

Referring next to Figure 3, an arrangement is shown wherein the impeller 49 of Figure 1 is replaced by another angularly disposed agitator plate 53, supported, for example, on a truncated hub member 51, secured to shaft 29. In this modification the plate 53 maintains good agitation in the bottom zone 25A but does not positively impel the feed and catalyst upwardly. For some purposes, the arrangement of Figure 1 appears to be preferable, as where the feed rate is very low. In Figure 3 the separator or partition plate 21A has a plurality of concentric rings of openings 23A. In actual test, the apparatus of Figure 3, operating at 450° F. and 0.5 gallon of feed per hour per pound of catalyst gave a conversion rate of 93% during early catalyst life. This decreased only to about 87% after a life of 30 gallons per pound.

Figure 4:
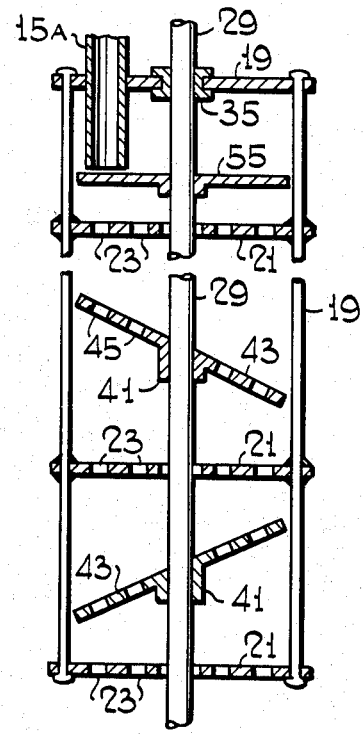
Figure 4 is another view of another arrangement of modified form.

In Figure 4, the impeller and the bottom "wobble" plate are both omitted. It will be noted that the alternate agitator or "wobble" plates are opposed 180° to maintain a surging action between adjacent zones. This is a preferred arrangement but for some purposes the plates may all be in phase so as to promote a tendency for surging from top to bottom of the whole reactor as shaft 29 rotates.

The means by which the olefinic material is fed into the reactor and the means by which the products are withdrawn are not shown. It should be noted, however, that the rate of the withdrawal and the manner in which it is effected should be such so as to substantially eliminate or at least greatly reduce entrainment of catalyst as the products are withdrawn. In the embodiment of Figure 4 a suitable baffle plate 55 is placed closely adjacent to the exit port 15A to held separate the entrained solid matter from the effluent materials. The plate 55 is of course fixed to and rotated by shaft 29 and it tends to separate catalyst and other solids from the liquid or fluid effluent by centrifugal action.

Where baffle plate 55 is not used a settling chamber may be provided where the solids which support the catalyst and the diluent solids, when the latter are used, may be separated from the effluent. A similar arrangement may be provided in Figure 1 but is not shown in the drawings.

It should be emphasized that it is desirable to have the shearing action of the agitator mechanism evenly distributed over substantially the entire reactor volume. This eliminates zones of low shear where agglomerates might otherwise build up. In the apparatus of the present invention the catalyst-liquid mixture is forced back and forth through the holes in both the stationary partitions and the rotating plates. This has been found to be a very effective way for stirring slurry mixtures.

While the invention has been described particularly in connection with the polymerization of lower olefins, which process is also an important aspect of the present invention, it will be understood that the apparatus and agitation aspects thereof are applicable also to other suspension or slurry processes and also to other processes involving the contacting of gases and/or liquids with solids. It will be appreciated that the invention may have various other related applications and that various modifications in apparatus and process may be made without departing from the spirit and purpose of the invention as specifically described. It is intended, therefore, to claim the invention as broadly as the state of the prior art permits.

What is claimed is:

1. In apparatus of the character described, the combination of a removable head member for a cylindrical reactor, a cage structure secured to said head member and removable from the reactor by removing said head member, said cage structure comprising a plurality of perforated parallel plates adapted to divide said reactor into a series of reaction zones when installed therein, a unitary rotatable shaft passing through the center portion of each of said plates and said head, and a plurality of obliquely disposed perforated agitating plates secured to said shaft for agitating materials in a plurality of said reaction zones.

2. Apparatus according to claim 1 which includes an effluent port in said head and a rotatable baffle closely adjacent said port and fixed to said shaft for assisting in separating entrained solids from an effluent stream.

References Cited in the file of this patent

UNITED STATES PATENTS

| Number | Name | Date |
|---|---|---|
| 1,156,606 | Lawrie | Oct. 12, 1915 |
| 1,893,667 | Darlington | Jan. 10, 1933 |
| 1,894,661 | Brooks | Jan. 17, 1933 |
| 2,106,366 | Tymstra | Jan. 25, 1938 |
| 2,134,571 | Morlock | Oct. 25, 1938 |
| 2,389,240 | Reid | Nov. 20, 1945 |
| 2,391,110 | Walker | Dec. 18, 1945 |
| 2,397,945 | Burney et al. | Apr. 9, 1946 |
| 2,491,618 | Luetzelschwab | Dec. 20, 1949 |
| 2,536,603 | Holmboe | Jan. 2, 1951 |
| 2,610,836 | Clarke | Sept. 16, 1952 |